United States Patent [19]

Reynolds

[11] Patent Number: 4,793,139
[45] Date of Patent: Dec. 27, 1988

[54] JOINT FOR TWO PIECE PLASTIC MASTER CYLINDER HOUSING

[75] Inventor: Desmond H. J. Reynolds, West Midlands, Great Britain

[73] Assignee: Lucas Industries Public Limited Company, Birmingham, England

[21] Appl. No.: 70,213

[22] Filed: Jul. 6, 1987

[30] Foreign Application Priority Data

Jul. 9, 1986 [GB] United Kingdom ............... 8616676

[51] Int. Cl.⁴ .......................... F15B 7/00; F01B 11/02
[52] U.S. Cl. ....................................... 60/562; 60/585; 92/169; 92/170
[58] Field of Search ................ 60/562, 585, 533, 583, 60/588; 92/170, 150, 151, 169.1, 169.2

[56] References Cited

U.S. PATENT DOCUMENTS

| | | | |
|---|---|---|---|
| 3,800,538 | 4/1974 | Jones | 60/562 |
| 4,474,005 | 10/1984 | Steer | 60/562 |
| 4,505,115 | 3/1985 | Arbuckle | 60/562 |
| 4,510,752 | 4/1985 | Gaiser | 92/170 |
| 4,559,781 | 12/1985 | Steer | 60/562 |
| 4,569,201 | 2/1986 | Hendrickson | 60/562 |
| 4,671,065 | 6/1987 | Ishiwata | 92/170 |
| 4,685,300 | 8/1987 | Steer | 60/562 |

FOREIGN PATENT DOCUMENTS 144563 11/1979 Japan ............................. 92/169.1

*Primary Examiner*—Edward K. Look
*Assistant Examiner*—George Kapsalas
*Attorney, Agent, or Firm*—Holman & Stern

[57] ABSTRACT

A tandem master cylinder includes a pair of separately molded plastic cylinder half portions joined together. Each contains a pressure chamber and a piston of the tandem circuit. Coaxial cylindrical bodies surround the cylinder portions, each joining to its respective cylinder portion at a location axially beyond the limits of inward axial travel along the cylinder of seals carried by the pistons so as to account for any differential shrinkage in molding. The cylindrical bodies interconnect at their ends to form a sealed joint locating the cylinder halves in correct radial and axial alignment. Reinforcement members around the cylinder halves resist expansion from internal pressure.

16 Claims, 2 Drawing Sheets

JOINT FOR TWO PIECE PLASTIC MASTER CYLINDER HOUSING

BACKGROUND OF THE INVENTION

1. Field of the Invention

This invention relates to a tandem master cylinder, primarily for use in a vehicle hydraulic brake actuating system, and incorporating a pair of high pressure chambers from which fluid pressure is supplied, in use, to respective separate braking circuits.

2. Description of the Prior Art

Tandem master cylinders require a long accurately formed cylinder bore and also necessitate severe changes in material thickness at certain locations in order to incorporate such items as hydraulic fluid port connections and a mounting flange. These requirements have resulted in conventional tandem master cylinders being generally unsuitable for manufacture by molding from plastics materials.

SUMMARY OF THE INVENTION

An object of the invention is to provide a tandem master cylinder which may be manufactured by molding from plastics materials, while maintaining the necessary overall strength and bore accuracy.

According to the invention, a tandem master cylinder comprises at least two separately molded cylinder portions of plastics material, each containing a pressure chamber and joined together in coaxial relationship, and respective pressure pistons slidable in the cylinder portions.

It has been found that the use of a plurality of separately formed cylinder portions, each of relatively short length, enables cylinder bores of sufficient accuracy to be formed therein by plastic molding techniques, enabling a tandem master cylinder to be successfully made from plastics material.

Each cylinder portion may conveniently be surrounded in spaced relationship over at least a part of its length by a respective generally cylindrical hollow body, each such body being joined to its associated cylinder portion at a location beyond the extent of the travel of a seal carried by the piston within that portion, the bodies being interconnected remote from said locations in order to join together said cylinder portions.

Advantageously, sealing is effected between the hollow bodies around the facing ends of the bodies. In one practical arrangement, a rigid member surrounds the junction between the cylinder portions and provides opposed faces against which the bodies are respectively sealed. This arrangement enables the seal between the parts to be formed in a low pressure region isolated from the pressure chambers. Conveniently, the rigid member also acts to locate the cylinder portions in correct radial and axial relationship.

Preferably, at least those regions of the cylinder portions defining the pressure chambers are surrounded by reinforcing members acting to resist expansion of the cylinder portions under the action of internal pressure.

In one convenient arrangement, one of the hollow bodies carries a mounting flange for fixing the master cylinder to a support, the flange preferably being connected to the associated cylinder portion solely by way of the hollow body which carries it.

In order to compensate for any slight radial misalignment of the respective bores of the cylinder portions, the pressure pistons form part of respective separate assemblies which co-act so as to enable actuating force applied to one piston assembly to be transmitted to the other.

BRIEF DESCRIPTION OF THE DRAWINGS

The invention will now be described, by way of example, with reference to the accompanying drawings wherein.

DETAILED DESCRIPTION OF THE PREFERRED EMBODIMENTS

Figure 1:
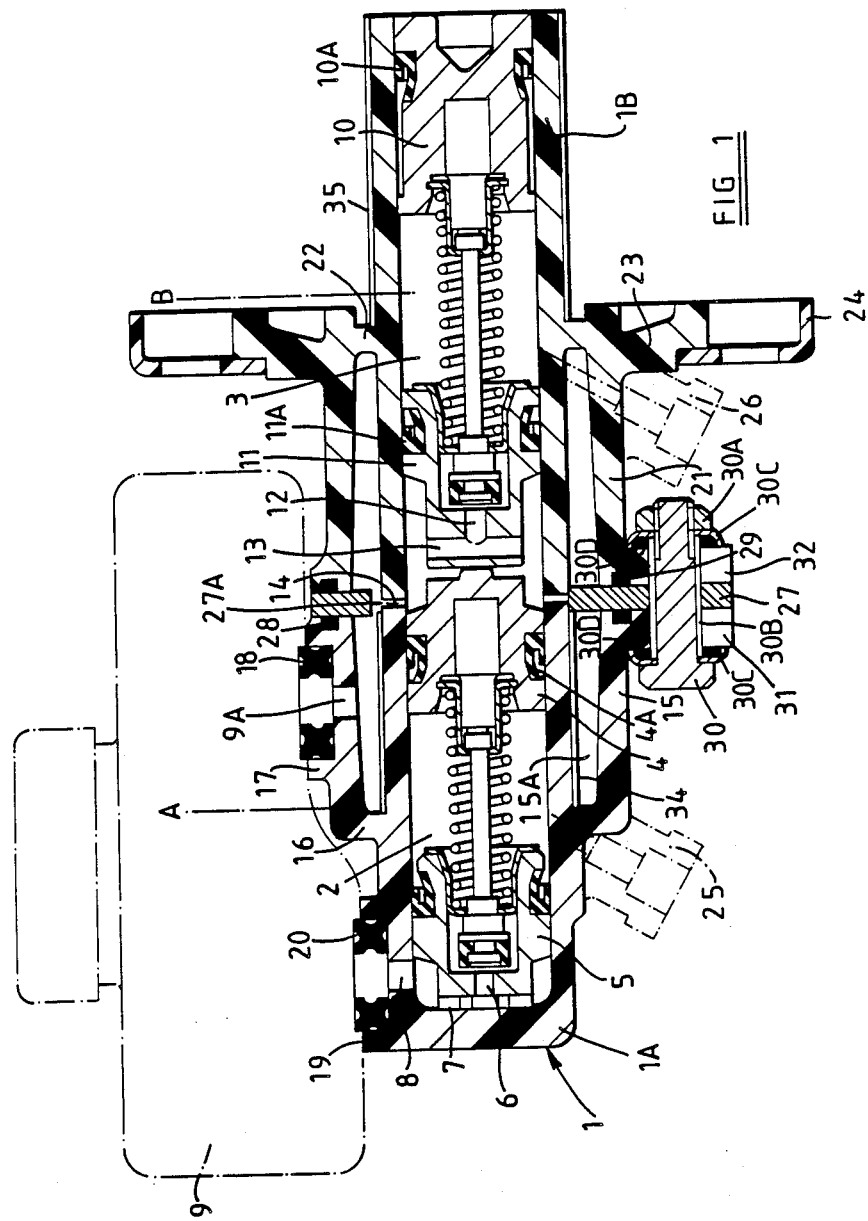
FIG. 1 is a longitudinal cross sectional view of one embodiment of the tandem master cylinder of the invention.

The tandem master cylinder illustrated in FIG. 1 comprises a pressure cylinder 1 which is composed of two cylinder portions 1A, 1B connected together in axial alignment and having respective pressure chambers 2, 3 therein. The pressure chamber 2 is defined between a piston 4 and a valve assembly 5, the latter being a conventional center valve controlling fluid flow through axial and radial passages 6 and 7 which communicate, in turn, with an inlet port 8 through which fluid enters the cylinder from a reservoir 9, in conventional manner. The axial passage 6 is formed in the valve assembly and the radial passage 7 is defined by an open-sided groove in the end of the valve assembly and the end of the cylinder 1 against which the valve assembly engages.

The pressure chamber 3 is defined between a piston 10 and a further valve assembly 11 which is again a conventional center valve controlling the flow of fluid through axial and radial passages 12 and 13 to a port 14 formed by a space between the cylinder portions and communicating with the reservoir in the manner to be described. The two assemblies comprising respectively the piston 4 and valve assembly 5 and piston 10 and valve assembly 11 are separate from one another, but interact by engagement of the valve assembly 11 with the piston 4, enabling actuating force to be applied from the piston 10 via the valve assembly 11 to the piston 4, as will be understood by those familiar with the art.

The cylinder portion 1A is surrounded in spaced relationship over part of its length by a hollow body 15 which is joined to its associated cylinder part by a radial web 16 disposed beyond the limit, indicated by the line 'A', of the inward travel along the cylinder of a seal 4A carried by the piston 4. The hollow body 15 is formed with a boss 17 for the reception of a sealing connection 18 between the reservoir and the cylinder part, an inlet port 9A being formed through the hollow body. A similar boss 19 on the cylinder receives a second sealing connection 20 between the reservoir and cylinder, the connection 20 surrounding the inlet port 8. A second hollow body 21 surrounds the cylinder portion 1B in spaced relationship and is connected to the cylinder portion 1B by a web 22 which is located beyond the limit, indicated by the line 'B', of the inward travel of a seal 10A carried by the piston 10. The hollow body 21 extends in the opposite direction to the hollow body 15 from its connection to the cylinder portion 1B and carries a radial flange 23, to which is fitted a metal flange portion 24, enabling the master cylinder to be fixed to a support structure such as the bulkhead of a vehicle. The connection of the hollow bodies 15 and 21 to their respective cylinder portions at locations outside the regions swept by the respective piston seals ensures that any differential shrinkage caused by the varying thicknesses of material embodied in the boss 17 and flange 23 causes minimum distortion to the swept part of the cylinder bores. Fluid outlets 25, 26 from the respective pressure chambers 2 and 3 are also formed in the region of the webs 16 and 22 so as to be outside the aforesaid areas swept by the piston seals, for the same reason.

An annular plate 27 surrounds the cylinder portions in the region of the junction between the two and lies between the facing ends of the hollow bodies 15 and 21 to provide opposed surfaces against which sealing of the hollow bodies may be effected by seals 28, 29. The seals are clamped against the plate 27 by means of screws 30 passing through flanges 31, 32 formed around the adjoining ends of the hollow bodies, and corresponding nuts 30A. Cup washers 30C associated respectively with each screw and nut bear against the respective ends of spacers 30B of predetermined length such as to limit the clamping force applied to the adjacent plastic. Seals 30D associated with the washers are compressed by the clamping action of the screws and nuts and, being resilient, are able to compensate for any 'creep' which occurs in the plastics material. The sealing of the hollow bodies is effected in a low pressure region isolated from the pressure chambers 2 and 3 by the seals 4A, 11A, enabling a high integrity fluid seal to be readily obtained. The passage 14 communicates with the reservoir port 9A via a gap 27A formed by a localized recess in the plate 27, and the space 15A defined around the cylinder portion 1A by the hollow body 15.

The parts of the cylinder walls swept by the respective piston seals are surrounded by respective reinforcing sleeves 34, 35 which act to resist outward bulging of these parts of the cylinder under the action of the internal cylinder pressure. An additional reinforcing sleeve (not shown) may be provided around that part of the cylinder portion 1B swept by a seal 11A carried by the piston 11. The reinforcing members may be of any convenient material such as metal or rigid plastics, which latter could incorporate other materials such as glass fiber. Various alternative forms of reinforcing members may be employed, such as a spiral coil or other open work formation.

Figure 2:
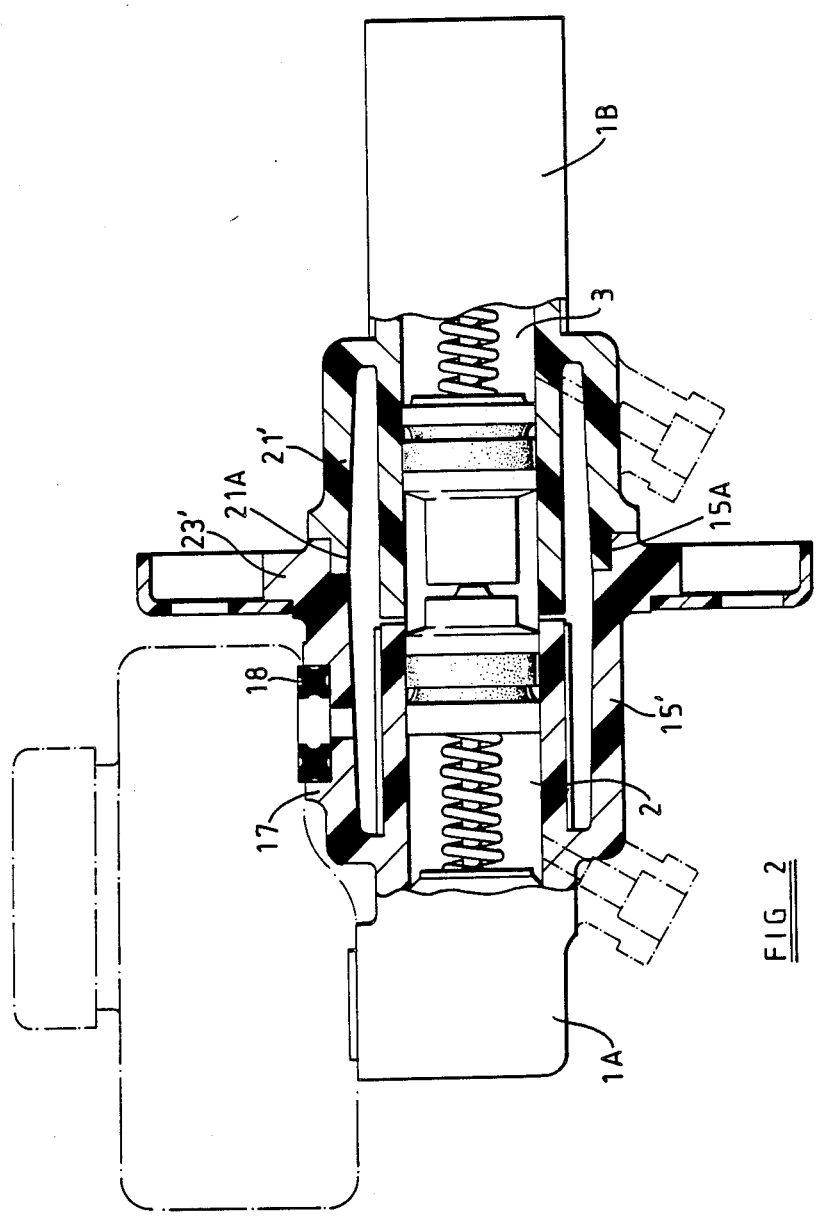
FIG. 2 is a view similar to FIG. 1 illustrating an alternative embodiment of the tandem master cylinder of the invention.

FIG. 2 illustrates an arrangement similar to that of FIG. 1, except that the flanges 31, 32 and fixing bolts 30 are dispensed with and the two hollow bodies 15′, 21′ are secured together by a conventional plastics welding, bonding or glueing process. For this purpose, the hollow body 21′ is provided with an end portion 21A of reduced diameter and the hollow body 15′ is provided with a complementary recess 15A to closely surround the portion 21′A of the hollow body 21. Securing is preferably effected over all of the interfitting surfaces associated with the recess 15A and portion 21A. In this embodiment, the flange 23′ is provided on the cylinder part 15′, attached to the cylinder portion 1A which sustains the longitudinal forces occasioned by the actuating pressure in the chambers 2 and 3. Such forces will be transferred via the flange 23′ onto a fixed structure to which the flange is secured, so that the pressure-derived forces within the cylinder are not sustained by the joint between the cylinder portions.

I claim:
1. A tandem master cylinder comprising:
   at least two separately molded cylinder portions of plastics material joined together in coaxial relationship with respect to each other;
   a pressure chamber in each of said cylinder portions;
   a respective pressure piston slidable in each pressure chamber;
   a respective seal mounted on each piston for sealing between each piston and the respective pressure chamber;
   a respective generally cylindrical body molded integrally with each of said cylinder portions and surrounding at least a part of the length of the respective cylinder portion in spaced relationship therewith;
   each cylindrical body being joined to the respective cylinder portion only at a joining location beyond the extent of travel of the respective seal on the respective piston within the respective cylinder portion; and
   said cylindrical bodies being interconnected at a region remote from said joining locations for connecting said cylinder portions together.

2. A master cylinder as claimed in claim 1 and further comprising:
   a reinforcing member surrounding at least one of said cylinder portions in at least the region thereof in which the respective pressure chamber is disposed for resisting expansion of said at least one cylinder portion under internal pressure in said respective pressure chamber.

3. A master cylinder as claimed in claim 1 wherein:
   each pressure piston comprises a separate assembly; and
   said separate pressure piston assemblies co-act so that actuating force applied to one piston assembly is transmitted to the other piston assembly.

4. A master cylinder as claimed in claim 1 and further comprising:
   outlet ports for the respective pressure chambers located closely adjacent the respective joining locations.

5. A master cylinder as claimed in claim 1 wherein:
   a first port is provided communicating with said pressure chambers;
   a second reservoir port is provided through one of said cylindrical bodies; and
   a space is defined between said cylinder portions and said cylindrical bodies comprising a communication passage between said first port and said second port.

6. A master cylinder as claimed in claim 1 wherein:
   said cylindrical bodies have ends thereon facing each other at said interconnection region; and
   the interior of said cylindrical bodies is sealed at said interconnection region.

7. A master cylinder as claimed in claim 6 wherein:
   said cylinder portions have ends facing each other;
   a rigid member is provided surrounding said facing ends of said cylinder portions; and
   sealing faces are provided on said rigid member at said interconnection region.

8. A master cylinder as claimed in claim 7 wherein:
   said rigid member further comprises means for locating said cylinder portions in correct radial and axial relationship with respect to each other.

9. A master cylinder as claimed in claim 7 and further comprising:

seal means between said facing ends of said cylindrical bodies and said sealing faces of said rigid member for sealing the interior of said cylindrical bodies.

10. A master cylinder as claimed in claim 9 wherein:
a first port is provided communicating with said pressure chambers;
a second reservoir port is provided through one of said cylindrical bodies; and
a space is defined between said cylinder portions and said cylindrical bodies comprising a communication passage between said first port and said second port.

11. A master cylinder as claimed in claim 1 and further comprising:
a mounting flange on one of said cylindrical bodies for mounting the master cylinder on a support.

12. A master cylinder as claimed in claim 11 wherein:
the respective cylinder portion is connected to said mounting flange solely by said cylindrical body on which said mounting flange is provided.

13. A master cylinder as claimed in claim 11 and further comprising:
a reservoir mounting means on one of said cylindrical bodies other than said one cylindrical body on which said mounting flange is provided.

14. A master cylinder as claimed in claim 11 wherein:
said cylindrical bodies have free end portions connected directly together at said interconnection region;
one of said cylinder portions is disposed forward relative to the direction of actuating travel of said pistons; and
said mounting flange is provided on said forward cylinder portion.

15. A master cylinder as claimed in claim 14 wherein:
said cylindrical bodies are connected together by welding.

16. A master cylinder as claimed in claim 14 wherein:
said cylindrical bodies are connected together by adhesion.

* * * * *